June 23, 1931.  L. MAMBOURG  1,810,920
SHEET GLASS APPARATUS
Filed June 21, 1926    2 Sheets-Sheet 1
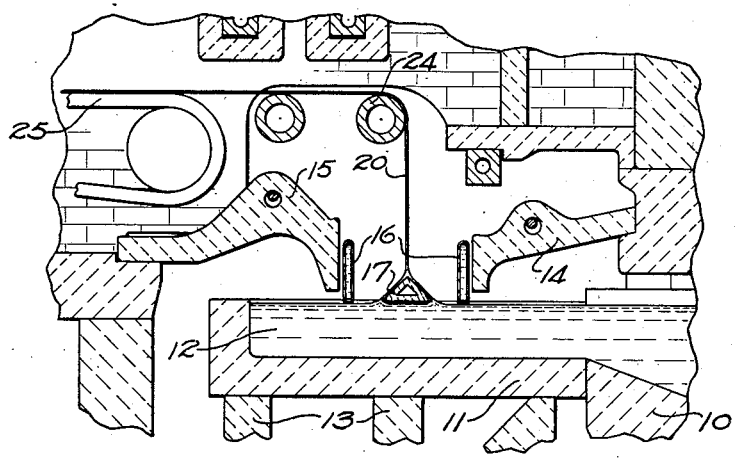
Fig. 1.
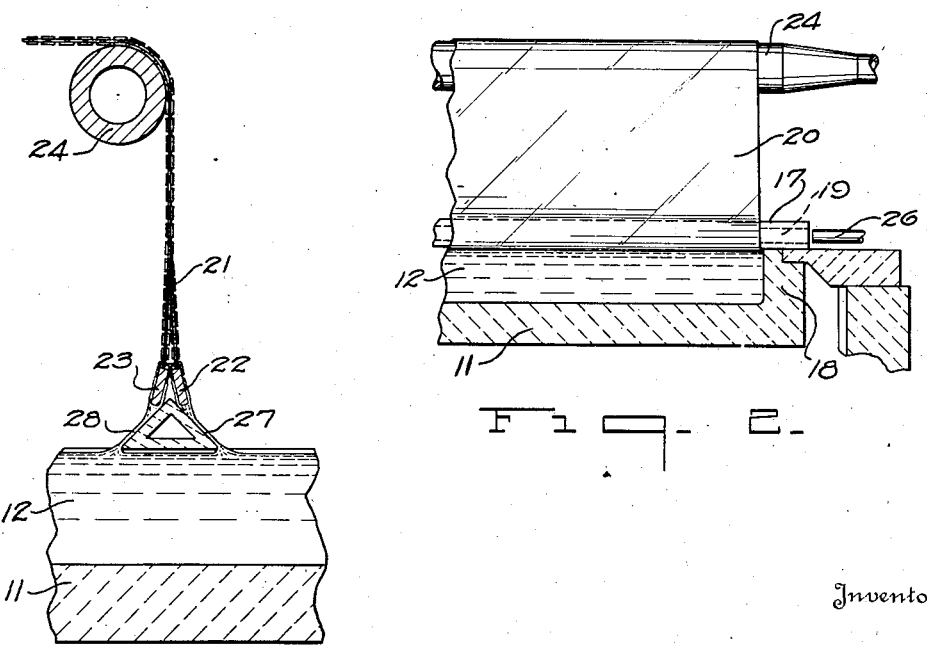
Fig. 2.
Fig. 3.
Inventor
Leopold Mambourg
By Frank Fraser
Attorney June 23, 1931.  L. MAMBOURG  1,810,920
SHEET GLASS APPARATUS
Filed June 21, 1926   2 Sheets-Sheet 2

Inventor
Leopold Mambourg
By Frank Fraser
Attorney

Patented June 23, 1931

1,810,920

UNITED STATES PATENT OFFICE

LEOPOLD MAMBOURG, OF LANCASTER, OHIO, ASSIGNOR TO LIBBEY-OWENS-FORD GLASS COMPANY, OF TOLEDO, OHIO, A CORPORATION OF OHIO

SHEET GLASS APPARATUS

Application filed June 21, 1926. Serial No. 117,302.

The present invention relates to sheet glass apparatus.

An important object of the invention is to provide a sheet glass apparatus, and includes means whereby two films of glass are united to form a single sheet.

Another object of the invention is to provide a process and apparatus for producing sheet glass wherein two streams of glass are drawn over suitable surfaces, after which they are united to produce a sheet of substantially predetermined thickness.

Another object of the invention is to provide a process and apparatus for producing sheet glass wherein a slab is arranged over a mass of molten glass in a manner that suitable films or streams of glass may be dragged over two surfaces of said slab, after which the two streams are united to form a single sheet of glass.

Still another object of the invention is to provide an apparatus of this nature wherein a slab is arranged over a mass of molten glass, and including means whereby a double bait arrangement may be dipped into said mass of molten glass and moved therefrom in a manner that two streams of glass will be pulled up over a slab and united at the top of said slab to form a single sheet.

Other objects and advantages of the invention will become apparent during the course of the following description.

Figure 4:
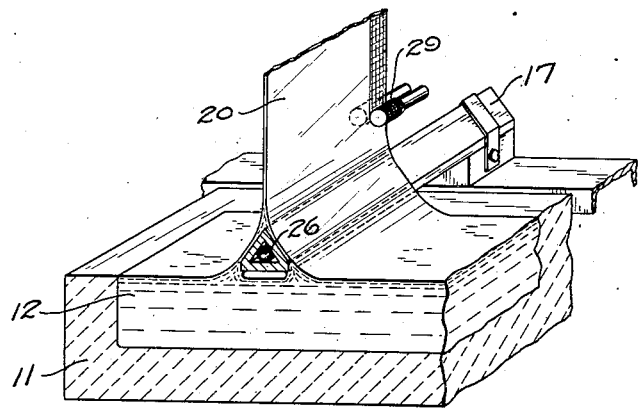
Figures 5, 6, 7:
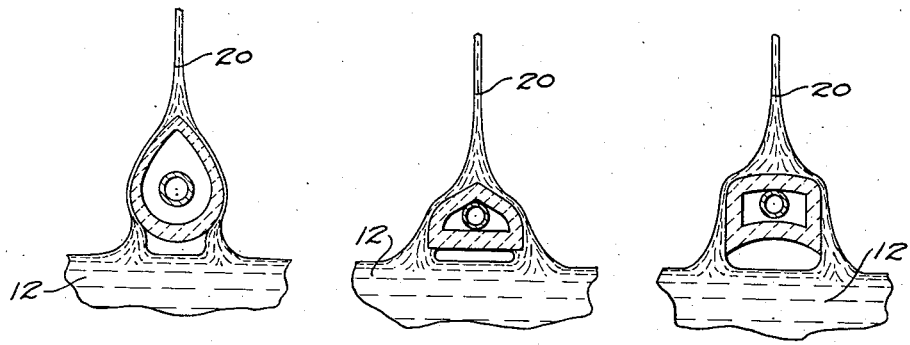

In the drawings wherein like numerals are employed to designate like parts throughout the same, Fig. 1 is a vertical longitudinal section through a glass forming apparatus illustrating one form of my invention in use, Fig. 2 is a transverse section through the apparatus, Fig. 3 is a fragmentary sectional view showing the type of bait used, Fig. 4 is a fragmentary perspective view of a slightly modified form of the invention, and Figs. 5, 6 and 7 show modified forms of slabs.

In the drawings the numeral 10 designates a tank furnace having connection with a suitable receptacle 11 which is known in the art as a draw pot, and which is adapted to contain a mass of molten glass 12 continuously supplied from the tank furnace 10. The pot 11 is preferably supported upon suitable stools 13 in a compartment adapted for heating the bottom and end wall of said pot.

Mounted over the mass of molten glass 12 are lip tiles 14 and 15 and lip tile coolers 16, arranged in spaced relation, leaving an exposed area on the surface of the molten glass 12 from which a sheet of glass may be produced.

Arranged preferably transversely of the pot 11 is a slab 17, which, as shown in Fig. 1, is substantially triangular in cross section. The slab 17 is preferably supported as shown in Fig. 2 upon the side walls 18 of the draw pot. The slab is preferably provided with a bore 19 through which a temperature control medium may be circulated as by means of the pipe 26.

To produce a sheet of glass 20, a double bait 21, comprising the chain portions carrying the ends 22 and 23, respectively, is moved into operative position. The member 22 is submerged in the glass on one side of the slab, while the member 23 is submerged in the glass on the other side. The bait is then moved upwardly in a manner that streams or films of glass will be moved up over the sides of the slab as indicated in Fig. 3. The streams are united at the upper end of the slab forming a single sheet of substantially uniform and predetermined thickness. The bait and sheet are preferably trained about a deflecting member such as a bending member or roll 24, and then over a draw table 25. After the sheet is started, the glass may be cracked off from the bait and the sheet then be continuously produced, thus the bait being used to start the draw only.

The bottom of the slab, as shown in the drawings, is preferably arranged in spaced relation to the surface of the molten glass from which the sheet is drawn. The slab is preferably formed from a highly polished non-corrosive alloy, such as nichrome, monel, etc. although it may be formed from a suitable refractory clay or the like. By properly controlling the temperature of the slab, two films or streams 27 and 28 may be dragged over the surfaces of said slab, which are of uniform thickness and temperature. When these two uniform streams are united at the top of the slab a sheet is produced which is flat and substantially free from all surface irregularities and defects. It will be seen that the slab does not come in contact with the outer surfaces of the sheet as the streams are united at the top of the slab with the inner sides of the films contacting with said slab.

In Fig. 4, rotatable members 29 are used at the edges of the sheet to assist in holding the width of the sheet. In Figs. 5, 6 and 7 are shown slightly modified forms of slab which may be used, and it will be seen that in all cases the lower edge of the slabs are arranged in spaced relation with respect to the surface of the molten glass and that two streams are dragged or pulled over the slabs, after which the two streams are united to form a single sheet.

The bottom of the slab is arranged in spaced relation to the surface of the glass thereunder, but preferably close enough to absorb heat therefrom. This heat absorption is in addition to the absorption from the glass between the lip tile coolers, thus permitting a more rapid formation of sheet than heretofore because the glass is conditioned more rapidly. Of course the cooling medium is circulated throughout the entire length of the slab and may be controlled in any desired manner.

It is to be understood that the form of the invention herewith shown and described is to be taken as the preferred embodiment of the same and that various changes in the shape, size and arrangement of parts may be resorted to without departing from the spirit of the invention or the scope of the subjoined claims.

Claims:

1. In sheet glass apparatus, a receptacle containing a mass of molten glass, stationary means arranged above the glass, and means for drawing a plurality of films of glass over said stationary means and in contact therewith.

2. In sheet glass apparatus, a receptacle containing a mass of molten glass, stationary means arranged above the glass, and means for drawing a pluarlity of films of glass over said stationary means and in contact therewith in a manner that the films of glass unite to form a single sheet.

3. In sheet glass apparatus, a receptacle containing a mass of molten glass, a slab arranged above said mass, and means for drawing a plurality of films of glass over said slab and in contact therewith.

4. In sheet glass apparatus, a receptacle containing a mass of molten glass, a slab arranged over the said mass and in spaced relation thereto, and means for drawing a plurality of streams of glass over said slab and in contact therewith.

5. In sheet glass apparatus, a receptacle containing a mass of molten glass, a slab arranged over the said mass and in spaced relation thereto, and means for drawing a plurality of streams of glass over said slab and in contact therewith, said streams uniting at the top of the slab to form a single sheet.

6. In sheet glass apparatus, a receptacle containing a mass of molten glass, a slab arranged over the glass and in spaced relation thereto, means for drawing a plurality of streams of glass over the slab and in contact therewith, and means for controlling the temperature thereof.

7. In sheet glass apparatus, a pot containing a mass of molten glass, a slab arranged over the glass and supported by the pot, and means for drawing a plurality of streams of glass over the slab, said streams uniting at the top of the slab to form a single sheet.

8. In sheet glass apparatus, a receptacle containing a mass of molten glass, a slab arranged over the glass and in spaced relation thereto, means for controlling the temperature of the slab, and means for drawing a plurality of streams of glass thereover simultaneously, said streams contacting with the slab and uniting at the top thereof to form a single sheet.

9. In sheet glass apparatus, a receptacle containing a mass of molten glass, a substantially triangular shaped slab arranged over the glass, and means for drawing streams of glass over two faces thereof and in contact therewith, said streams uniting to form a single sheet.

10. In sheet glass apparatus, a receptacle containing a mass of molten glass, a substantially triangular shaped slab arranged above the glass and in spaced relation thereto, and a double bait for drawing a stream of glass up both sides of said slab simultaneously.

11. In sheet glass apparatus, a receptacle containing a mass of molten glass, a substantially triangular shaped slab arranged above the glass and in spaced relation thereto, and a double bait for drawing a stream of glass up both sides of said slab simultaneously said streams uniting at the top of said slab to form a single sheet.

12. In sheet glass apparatus, a receptacle containing a mass of molten glass, a substantially triangular shaped slab arranged above the glass and in spaced relation thereto, a double bait for drawing a stream of glass up both sides of said slab simultaneously, and means for controlling the temperature of the slab.

13. In sheet glass apparatus, a receptacle containing a mass of molten glass, a substantially triangular shaped slab arranged above the glass and in spaced relation thereto, a double bait for drawing a stream of glass up both sides of said slab simultaneously, said streams uniting at the top of said slab to form a single sheet, and means for controlling the temperature of the slab.

14. In sheet glass apparatus, a receptacle containing a mass of molten glass, a slab arranged above the mass, means for drawing two streams of glass thereover simultaneously and in contact therewith, said streams uniting at the top of the slab to form a single sheet, and means for preventing narrowing of the sheet.

15. In sheet glass apparatus, a bait comprising two similar sections freely movable relative to one another, each section being provided for submersion in a mass of molten glass, said sections drawing two streams of glass from a molten mass simultaneously.

16. The process of producing sheet glass consisting in drawing a plurality of streams of glass upwardly from the surface of a bath of molten glass, passing the streams after leaving said bath over the sides of a single guiding member and in contact therewith, and then uniting said streams to form a single sheet.

17. The method of forming sheet glass which comprises creating two streams of molten glass, uniting said streams, cooling the space between the streams adjacent to their line of juncture and drawing the sheet formed by the union of said streams upwardly.

18. The process of producing sheet glass consisting in drawing a plurality of streams of glass upwardly from the surface of a bath of molten glass, passing the streams after leaving said bath over the sides of a single guiding member and in contact therewith, then uniting said streams to form a single sheet, and in cooling the space between the streams adjacent to their line of juncture.

19. The method of forming sheet glass, which comprises creating two streams of molten glass, passing said streams over the sides of a single guiding member and in contact therewith, uniting said streams upon leaving said member, cooling the space between the streams adjacent to their line of juncture and drawing the sheet formed by the union of said streams upwardly.

20. In sheet glass apparatus, a bait comprising two similar sections provided for submersion in a mass of molten glass, said sections drawing two streams of glass from the molten mass simultaneously, and means for supporting said sections so that they are freely movable relative to one another and so that they normally tend to move toward each other during drawing of the two streams of glass upwardly from the molten mass whereby to effect a uniting of said streams.

21. The method of forming sheet glass, which consists in feeding a pair of streams of molten glass upwardly from a molten bath, passing said upwardly moving streams over stationary converging directing surfaces, uniting said streams as they leave said surfaces to form a single sheet, and in then continuing upward movement of said sheet.

22. The method of forming sheet glass, which consists in feeding a pair of streams of molten glass upwardly from a molten bath, passing said upwardly moving streams over stationary converging directing surfaces to a point above the level of said molten bath, uniting said streams as they leave said surfaces to form a single sheet, and in then continuing upward movement of said sheet.

Signed at Lancaster, in the county of Fairfield, and State of Ohio, this 18th day of June, 1926.

LEOPOLD MAMBOURG.